United States Patent [19]

Hirabayashi

[11] Patent Number: 5,787,205

[45] Date of Patent: Jul. 28, 1998

[54] MOTION VECTOR DETECTING DEVICE

[75] Inventor: Yasuji Hirabayashi, Kawasaki, Japan

[73] Assignee: Canon Kabushiki Kaisha, Tokyo, Japan

[21] Appl. No.: 933,501

[22] Filed: Sep. 18, 1997

Related U.S. Application Data

[63] Continuation of Ser. No. 527,813, Sep. 18, 1995, abandoned, which is a continuation of Ser. No. 128,119, Sep. 29, 1993, abandoned.

[30] Foreign Application Priority Data

Oct. 7, 1992 [JP] Japan ................... 4-268709

[51] Int. Cl.$^6$ ................... G06K 9/36
[52] U.S. Cl. ................... 382/236; 382/107
[58] Field of Search ................... 382/107, 236; 348/407, 413, 412, 415, 416

[56] References Cited

U.S. PATENT DOCUMENTS

| | | | |
|---|---|---|---|
| 4,562,468 | 12/1985 | Koga | 348/413 |
| 5,031,039 | 7/1991 | Haguiri | 348/413 |
| 5,043,808 | 8/1991 | Knauer | 348/407 |
| 5,086,487 | 2/1992 | Katayama et al. | 382/56 |
| 5,089,887 | 2/1992 | Robert et al. | 358/105 |
| 5,150,209 | 9/1992 | Baker | 348/407 |
| 5,162,923 | 11/1992 | Yoshida et al. | 358/433 |
| 5,210,605 | 5/1993 | Zaccarin | 348/416 |
| 5,227,877 | 7/1993 | Yukitake | 348/416 |
| 5,258,836 | 11/1993 | Murata | 348/416 |

FOREIGN PATENT DOCUMENTS

| | | |
|---|---|---|
| 0360698 | 3/1990 | European Pat. Off. . |
| 0518314 | 12/1992 | European Pat. Off. . |
| 2-294180 | 12/1990 | Japan . |
| 4-127690 | 4/1992 | Japan . |
| 92/19068 | 10/1992 | WIPO . |

*Primary Examiner*—Yon J. Couso
*Attorney, Agent, or Firm*—Fitzpatrick, Cella, Harper & Scinto

[57] ABSTRACT

The present invention provides a motion vector detecting device or method by which dependable motion vectors are detected. The device, according to one aspect of the invention, searches for a similar block in a previous image to a subject block in both a first area expanding from a corresponding position to the subject block and a second area expanding from a position indicated by a predictive vector and detecting a motion vector according to a result of the searching. Because there is a fair possibility of occurring the similar block in both the first and second areas.

22 Claims, 3 Drawing Sheets

MOTION VECTOR DETECTING DEVICE

This application is a continuation of application Ser. No. 08/527,813 filed Sep. 18, 1995, now abandoned, which was a continuation of application Ser. No. 08/128,119 filed Sep. 29, 1993, now abandoned.

FIELD OF THE INVENTION

This invention relates to a motion vector detecting device and, in particular to a device which detects blocks in a previous field or frame which are most similar to a subject block in the present field or frame.

DESCRIPTION OF THE PRIOR ART

So-called block-matching is well known as one method for detecting a motion vector. The "block-matching" type of motion vector detecting method is recognized as a method for searching for the block in the preceding frame which is similar to each block in the present frame and providing a motion vector for each block in the present frame.

The fundamental idea of the block-matching motion vector detecting method is explained as follows.

A block in a present frame which has 'm' number of pixels in a horizontal direction and 'n' number of pixels in a vertical direction and which has the upper left-hand corner pixel positioned (i,j) is expressed as $B_{ij}(m,n)$. The block in the preceding frame positioned at the same position as $B_{ij}(m,n)$ is expressed as $P_{ij}(m,n)$.

The evaluating function (F) which expresses the differences between $B_{ij}(m,n)$ and $P_{ij}(m,n)$ is defined by the following formula:

$$F(i,j) = \sum_{}^{m} \sum_{}^{n} (B_{ij} - P_{i+x,j+y})^2$$

At this point, $B_{ij}$ expresses a level of a pixel positioned (i,j) in the present frame, and $P_{i+x,j+y}$ expresses a level of a pixel positioned (i+x,j+y) in the preceding frame. The motion vector of the block $B_{ij}$ is decided by values of (x,y) which produce the smallest value of $F(i,j)$ when each of values of (x,y) varies between $-S$ and $+S$ where S is a parameter which indicates a limit of searching.

A colour motion image signal is generally divided into luminance data (Y) and colour different data (e.g Cr, Cb), it is usual to use luminance data (Y) which includes much spatial information, for searching for the motion vector.

The method for searching another motion vector in a range a centre of which corresponds to a vector produced for the preceding block or a neighbouring block, and the method for presuming a movement of a whole frame by computing a correlation between positions of the blocks and motion vectors of the blocks for each block are well known and conventional.

For example, motion images used for a tele-conference, a videophone, etc have an area corresponding to a background and an area corresponding to a person. In the background area, there is little movement of image between adjacent frames, while there is a movement of image corresponding to a movement of the person around the area of the person.

It has already been tried to predict a new motion vector by using a vector produced for the preceding block or the neighbour block while processing motion images. This method of predicting appears to predict a motion vector efficiently by predicting a stationary block in a stationary area and predicting a moving block in a moving area.

However, this method suffers from the following drawbacks when applied to a practical moving image. For example, if there are a stationary background and a leftward moving person in the centre of the frame and the image signal is processed in a rightward horizontal direction by the block, the processed blocks are in areas in the order of background-person-background. The prediction of the motion vector is effective in a first stationary background area, however, a large predictive error occurs immediately after the process of the prediction when in the area of the leftward moving person. The prediction of the motion vector gradually gets better in the moving area, but it is doubtful that it will produce a sufficient effective prediction until such process comes into another stationary area and error accumulates. Further, when the process again comes into the stationary area, a serious error occurs because prediction is based on the moving area. The error also gradually decreases in the stationary area, but the accumulated error has grown more seriously.

Systems for teleconferencing or videophone conventionally predict only one vector for each frame, though there are relatively apparent stationary and moving areas in the frame handled by the system. Accordingly, predicted vectors oscillate between a zero vector for the stationary area and a vector having a certain value for the moving area, as a block to be processed passes through the stationary and moving areas. Such prediction provides a resultant vector which is not suitable for either of the areas.

SUMMARY OF THE INVENTION

One of the objects with which the invention is concerned is to provide a motion vector detecting device by which dependable motion vectors are detected.

A further object with which the invention is concerned is to provide a motion vector detecting device which can predict a motion vector dependably.

A motion vector is detected, according to one aspect of the invention, by searching for a block in a previous image similar to a subject block in both a first area based upon a corresponding position to the subject block and a second area based upon a position indicated by a predictive vector and detecting a motion vector according to a result of the searching.

A motion vector is predicted, according to another aspect of the invention, by producing a predictive vector according to a previous motion vector and ignoring a previous motion vector which has a value within a predetermined range, or by replacing an invalid value of the predictive vector for the subject block with a value of the predictive vector which is previously produced.

Other objects of the invention and other aspects of the invention will be apparent from the following description and drawings.

DETAILED DESCRIPTION OF EMBODIMENTS

Embodiments of the present invention will now be described, by way of example only, with reference to the accompanying drawings.

Figure 1:
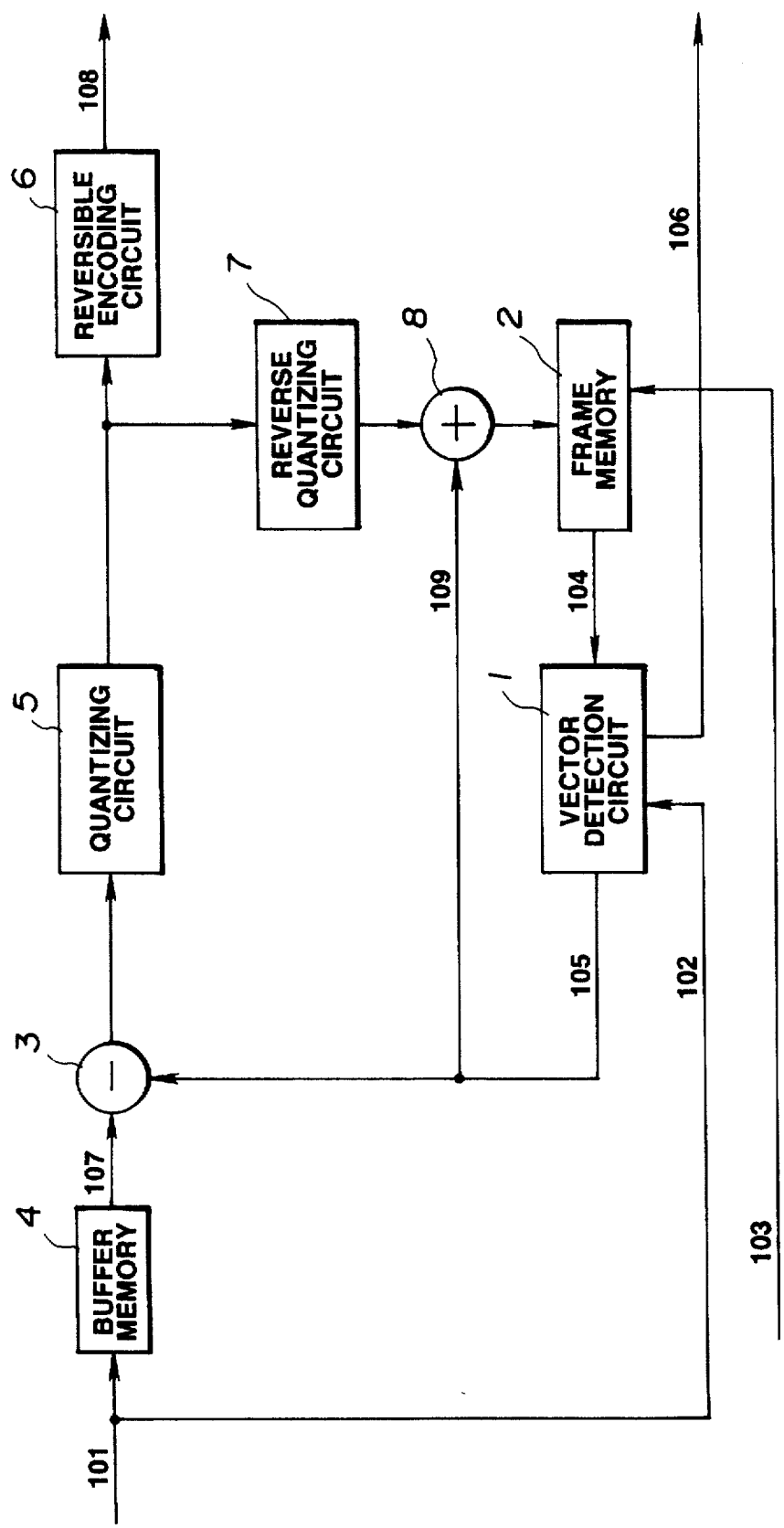
FIG. 1 shows a block diagram of an encoding apparatus which uses a motion vector detecting circuit according to the present invention.

FIG. 1 shows a block diagram of a motion image compressing and encoding apparatus. In FIG. 1, a vector detecting circuit 1 detects motion vectors on the basis of an image signal of the present frame and an image signal of the previous frame. Vector detecting circuit 1 will be described in greater detail below. A frame memory 2 stores the image signal of the previous frame. A subtracting circuit 3 subtracts the image signal of the present frame from the image signal of the previous frame which has been compensated for a motion of the image in the vector detection circuit.

A buffer memory 4 delays the image signal of the present frame. A quantizing circuit 5 quantizes the data of each pixel output from the subtracting circuit 3. A reversible encoding circuit 6 encodes quantized code produced by the quantizing circuit to compress the amount of data thereof. A reverse-quantizing circuit 7 outputs one of representative values of quantizing steps according to the quantized code. An adding circuit 8 adds the image signal of the previous frame to the representative value to produce a local decoded value of the image signal of the present frame.

The compressing operations of the motion image compressing and encoding apparatus constructed as mentioned above are described in detail as follows.

The image data of the present frame are supplied to the vector detection circuit 1 via lines 101,102 by a block as a unit. Each of the blocks of the image data is composed of the data corresponding to a plurality of pixels. On the other hand, a block address signal indicating each of the blocks is input to the frame memory via a line 103. The image data of the previous frame positioned in a vector searching area, decided on the basis of the block address signal and surrounding a subject block, are read from the frame memory 2 and are supplied to the vector detection circuit 1 via a line 104.

The vector detection circuit 1 outputs the image data of the block which are evaluated as the most suitable block in the vector searching area to a line 105, and outputs the detected motion vector to a line 106.

The blocks of the present frame, delayed by a predetermined period of time which is necessary to detect the most suitable block, are supplied to the subtracting circuit 3, and the most suitable blocks which are similar to the blocks output from the buffer memory 4 are simultaneously supplied to the subtracting circuit 3. The subtracting circuit 3 calculates differential data by subtracting the most suitable blocks from the blocks of the present frame and the differential data are supplied to the quantizing circuit 5.

The quantizing circuit 5 quantizes the differential data to produce quantized codes to be supplied to the reversible encoding circuit 6 and reverse-quantizing circuit 7. The reversible encoding circuit 6 allots reversible codes to the quantized codes. The reversible codes encoded by the circuit 6 are output from a line 108.

In a preferred construction, the encoding circuit 6 processes by the block to compress the amount of data. For example, the encoding circuit can use a circuit which includes the Discrete Cosine Transformation (DCT) circuit and an adaptive quantizer and constructs a reversible encoding.

A reverse-quantizing circuit 7 receives the quantized codes and outputs representative values thereof to reproduce the differential data. The reproduced differential data are added to the image data of the most suitable block in the previous frame supplied via a line 109 by the adding circuit 8. The data added in the adding circuit 8 are supplied to the frame memory 2, and are stored therein.

In the above mentioned way, the encoding apparatus shown in FIG. 1 is able to compress an amount of image data and to output compressed image codes from the line 108.

Figure 2:
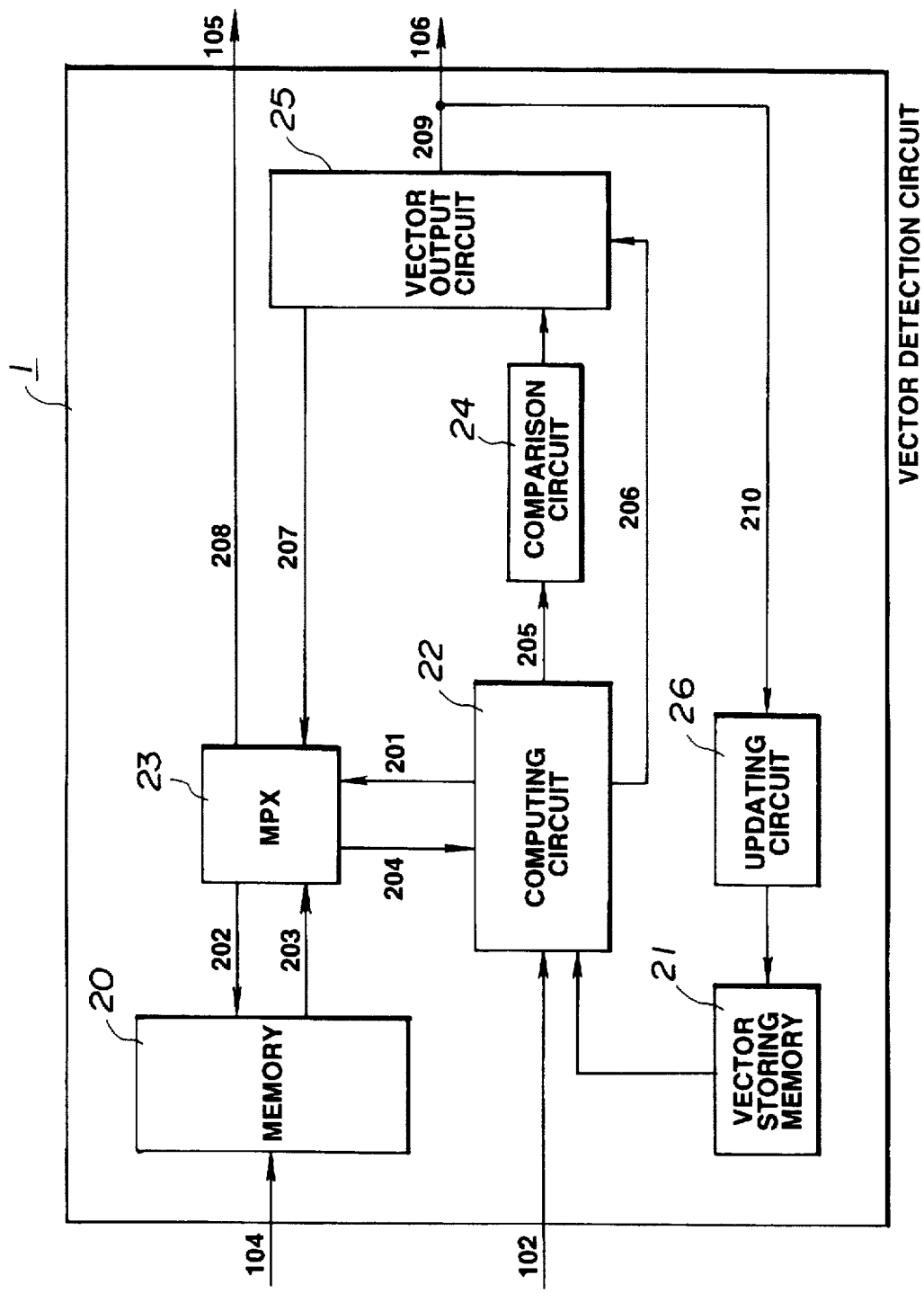
FIG. 2 shows a block diagram which shows the motion vector detecting circuit shown in FIG. 1 in detail.

FIG. 2 shows a block a diagram of the vector detection circuit 1 shown in FIG. 1, and the details of the circuit 1 are described in the followings.

Figure 3:
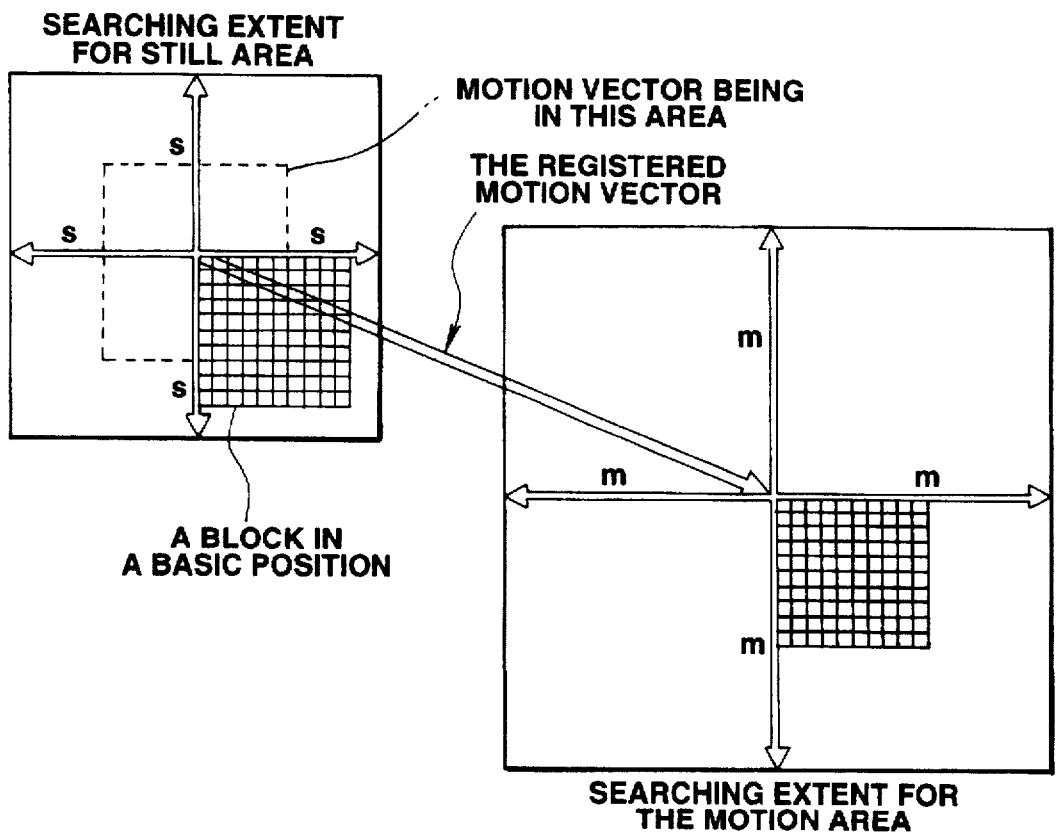
FIG. 3 shows a model for describing the motion vector and areas in which a new motion vector is searched.

In this embodiment, the vector searching area comprises a fixed (still) area and a variable (motion) area, as mentioned above. FIG. 3 shows a model by which the still and motion areas are described.

A block in a basic position in the still search area and one in the motion search area are shown in FIG. 3. The extents that the block can be shifted for searching in the horizontal and vertical directions in the still area are "S" as shown in FIG. 3, and both of the extents that the block can be shifted for searching in the horizontal and vertical directions in the motion area are "m" as shown in FIG. 3. In FIG. 3, two squared regions indicate positions of the upper left-hand corner pixels in the still and motion areas.

The still area is spread around the position in which the subject block of the present frame is located, and the motion area is spread around the position shifted from the position of the subject block according to a registered motion vector.

A memory 20 is arranged to receive the image data of a previous last frame output from the frame memory shown in FIG. 1 via the line 104. A computing circuit 22 is arranged to receive the image data of the present frame via the line 102.

Firstly, the computing circuit 22 outputs a vector which indicates a position of an object block relative to the subject block via a line 201. The vector is supplied to a multiplexer (MPX) 23, and the MPX 23 produces address data in response to the vector. The address data are input to the memory 20 via a line 202, and the memory 20 reads the image data of the object block. The image data of the object block are supplied to the MPX 23 via a line 203, and the MPX supplies them to the computing circuit 22 via a line 204.

The computing circuit 22 computes differences between the subject block and the object block by using a predetermined evaluating function. It is possible to use the function described in the prior art as the predetermined evaluating function.

The computing circuit 22 updates the vector indicating the object block such that all blocks in the still search area are designated as the object block in turn. The blocks can be overlapped with each other and can be shifted by one pixel as a unit. The value of the differences and the vector indicating the object block are supplied to a comparison circuit 24 via a line 205, and the comparison circuit 24 updates a stored vector by the vector when the value of the differences is smaller than a stored value. Accordingly, the smallest value of the differences and the corresponding vector remain in the comparison circuit 24.

After all blocks in the still area have been designated as the object block, all blocks in the motion area are designated as the object block. A vector storing memory 21 registers motion vectors of the previous frame for all blocks. The computing circuit 22 reads a registered motion vector corresponding to the subject block, and updates the vector indicating the object block such that all blocks in the motion area are designated as the object block in turn.

After all blocks in the still and motion search areas have been designated, the smallest value of the differences and the corresponding vector which indicate the most similar block among the all blocks in the still and motion areas remain in the comparison circuit 24. Then, the computing circuit 22 supplies an ending signal which indicates an end of evaluating all blocks to a vector output circuit 25 via a line 206. The vector output circuit 25 reads out the vector remaining in the comparison circuit 24 as a motion vector of the subject block, and supplies an instruction signal to the MPX 23 via a line 207 for reading out the image signal of the block corresponding to the vector.

The MPX 23 reads out the image signal of the most similar block to the subject block from the memory 20 via the line 203 and outputs it to the external line 105 via a line 208. The vector output circuit 25 outputs the motion vector on the external line 106 via a line 209. As described above, the motion vector on the line 106 is utilised for encoding the image signal.

The motion vector is also supplied to an updating circuit 26 via a line 210. The updating circuit 26 discriminates whether the motion vector is raised in a motion region of the image or a still region of the image. The circuit 26 registers the motion vector in the vector storing memory 21 instead of the old motion vector of the block positioned at the same position in the previous frame if the motion vector is discriminated to be raised in the motion region.

One method for executing the above mentioned discrimination used in this embodiment is described below referring to FIG. 3.

Assuming that the block can be shifted the extent "S" in the still area and the motion vector output from the vector output circuit 25 is expressed (vx,vy), the motion vector is discriminated as an invalid vector for predicting if both ($|vx| \leq S/2$) and ($|vy| \leq S/2$) are true and is discriminated as a valid vector for predicting in other cases. In short, a motion vector having a value within a predetermined range shown by a dotted line in FIG. 3 is ignored by the predicting circuit. Further, the previous motion vector is automatically kept in the memory 21 as the predictive vector. In other words, the predictive vector is interpolated by the previous predictive vector positioned at the same position in the previous frame.

These processes affect to detect more dependable predictive motion vectors and to increase a probability of giving an exact prediction.

As mentioned above, the apparatus shown in FIG. 1 can detect dependable motion vectors, because the similar block in the previous frame to the subject block is searched in both the still search area and the motion search area in both of which there is a fair possibility of occurring the similar block to the subject block. And, the apparatus shown in FIG. 1 can make a dependable prediction of the motion vector, because the unreliable motion vectors are ignored for predicting the motion vectors.

The skilled reader will, of course, appreciate that in the case of an interlaced image signal, the present and previous images may be chosen to be fields or frames, according to the needs of the system designer. Similarly, the previous image (field or frame) selected for use in the block matching search need not be the one immediately preceding the present image in the motion image sequence.

I claim:

1. A motion vector detecting device comprising:

input means for sequentially inputting a plurality of images, each image being divided into blocks comprised of a plurality of pixels;

predicting means for predicting a motion vector for a subject block in a current image based on a registered vector in a previous image;

detecting means for detecting a motion vector for the subject block by searching for a block similar to the subject block among selected blocks in the previous image, the selected blocks being only in a first area of the previous image which extends out from a position corresponding to the subject block in the previous image, the first area corresponding to a still area of the previous image, and in a second area of the previous image which extends out from a position indicated by the registered vector, the second area corresponding to a motion area of the previous image.

2. A method for detecting motion vectors in a current images comprising the steps of:

sequentially inputting a plurality of images, each image being divided into blocks comprised of a plurality of pixels;

storing registered motion vectors for blocks of a previous one of the plurality of images; and detecting a motion vector for a subject block in a current image by searching for a block similar to the subject block among selected blocks of the previous image, the selected blocks being only in a first area and in a second area of the previous image;

wherein the first area of the previous image corresponds to a position of the subject block in the current image, the first area corresponding to a still area of the image; and wherein the second area corresponds to a position indicated by a registered vector corresponding to the subject block, the second area corresponding to a motion area of the image.

3. A device according to claim 2, wherein said predicting means disregards a previous motion vector which has a value within a predetermined range.

4. A device according to claim 3, wherein said predetermined range is determined to correspond to an area within the first area of the previous image.

5. A device according to claim 3, wherein said predicting means compensates for the registered vector for the subject block by using a previous registered vector when the value of the registered vector for the subject block is recognized as an invalid value.

6. A device according to claim 5, wherein said predicting means maintains a value of the previous registered vector when the motion vector has a value within the predetermined range.

7. A device according to claim 1, further comprising previous image preparing means which outputs pixels of the previous image in an order which is controlled on the basis of the motion vector.

8. A device according to claim 7, further comprising encoding means for encoding difference values between the pixels of the previous image and pixels of the present image.

9. A motion vector detecting method comprising the steps of:

successively inputting a plurality of images, each image being divided into blocks comprised of a plurality of pixels;

predicting a motion vector for a subject block in a current image based on a registered vector in a previous image;

searching for a block similar to the subject block among selected blocks in a previous image, the selected blocks being only in a first area of the previous image which extends out from a position corresponding to the subject block in the previous image, the first area corresponding to a still area of the previous image, and in a second area of the previous image which extends out from a position indicated by the registered vector, the second area corresponding to a motion area of the previous image; and detecting a motion vector for the subject block according to a result of said step of searching.

10. A motion vector detecting device, comprising:

input means for successively inputting a plurality of images, each image being divided into blocks comprised of a plurality of pixels;

predicting means for producing a predictive vector for a subject block in a current one of the plurality of images, the predictive vector predicting a movement direction of the subject block; and detecting means for detecting a motion vector for the subject block by using a previous one of the plurality of images, the current image, and the predictive vector;

wherein the predicting means produces the predictive vector by using a motion vector for a previous block in the previous image; and wherein, when producing the predictive vector, the predicting means ignores motion vectors for the previous block which have a value within a predetermined-range.

11. A device according to claim 10, wherein said predicting means makes up for the predictive vector for the subject block by using a previous predictive vector when the value of the predictive vector for the subject block is recognized as an invalid value.

12. A device according to claim 10, wherein said predicting means makes up for the predictive vector for the subject block by using a previous predictive vector when the value of the predictive vector for the subject block is recognized as an invalid value.

13. A device according to claim 10, wherein said detecting means searches for a similar block in the previous image to the subject block to decide the motion vector.

14. A device according to claim 13, wherein said detecting means searches for the similar block in both a first area extends out to a position corresponding to the subject block and a second area extends out to a position indicated by the predictive vector.

15. A device according to claim 14, wherein said predetermined range corresponds to the extent of the first area.

16. A device according to claim 10, further including previous image preparing means which outputs pixels of the previous image in an order which is controlled on the basis of the motion vector even if the motion vector has a value within the predetermined range.

17. A device according to claim 16, further comprising encoding means for encoding difference values between the pixels of the previous image and pixels of the present image.

18. A motion vector detecting method, comprising the steps of:

successively inputting a plurality of images, each image being divided into blocks comprised of a plurality of pixels;

producing a predictive vector for a subject block in a current one of the plurality of images, the predictive vector predicting a movement direction of the subject block; and detecting a motion vector for the subject block by using a previous one of the Plurality of images, the current image, and the predictive vector;

wherein the producing step produces the predictive vector by using a motion sector for a previous block in the previous image; and wherein, when producing the predictive vector, the producing step ignores motion vectors for the previous block which have a value within a predetermined range.

19. A motion vector detecting device comprising:

input means for successively inputting a plurality of images, each image being divided into blocks comprised of a plurality of pixels;

predicting means for producing a predictive vector for a subject block in a current one of the plurality of images, the predictive vector predicting a movement direction of the subject block and being used to define a search area for detecting a motion vector in a motion area of a previous image; and detecting means for detecting a motion vector for the subject block by using a previous one of the plurality of images, the current images and the predictive vector, wherein said predicting means replaces a value of the predictive vector for the subject block with a value of a previous predictive vector, the previous predictive vector having been produced for a block in the previous image, in a case where the value of the predictive vector for the subject block is recognized as being an invalid value.

20. A device according to claim 18, wherein said predicting means replaces the invalid value of the predictive vector for the subject block with a value of the preceding predictive vector for a block being at the same position to the subject block.

21. A motion vector detecting method, comprising the steps of:

successively inputting a plurality of images, each image being divided into blocks comprised of a plurality of pixels;

producing a predictive vector for a subject block in a current one of the plurality of images, the predictive vector predicting a movement direction of the subject block and being used to define a search area for detecting a motion vector in a motion area of a previous image;

detecting a motion vector for the subject block by using a previous one of the plurality of images, the current images and the predictive vector, wherein the producing step replaces a value of the predictive vector for the subject block with a value of a previous predictive vector, the previous predictive vector having been produced for a block in the previous image, in a case where the value of the predictive vector for the subject block is recognized as being an invalid value.

22. A device for detecting motion vectors in a current images comprising:

input means for sequentially inputting a plurality of images, each image being divided into blocks comprised of a plurality of pixels;

storing means for storing registered motion vectors for blocks of a previous one of the plurality of images; and detecting means for detesting a motion vector for a subject block in a current one of the plurality of images by searching for a block similar to the subject block among selected blocks of the previous image, the selected blocks being only in a first area and in a second area of the previous image;

wherein the first area of the previous image corresponds to a position of the subject block in the current image, the first area corresponding to a still area of the previous image; and wherein the second area corresponds to a position indicated by a registered vector corresponding to the subject block, the second area corresponding to a motion area of the previous image.

* * * * *

UNITED STATES PATENT AND TRADEMARK OFFICE
CERTIFICATE OF CORRECTION

PATENT NO. : 5,787,205

DATED : July 28, 1998

INVENTOR : Yasuji Hirabayashi

Page 1 of 2

It is certified that error appears in the above-identified patent and that said Letters Patent is hereby corrected as shown below:

COLUMN 1

Line 10, "particular" should read --particular,--.

COLUMN 6

Line 10, "images" should read --image,--;
   Line 15, "and detecting" should read
   -- and (¶)
      detecting--.

COLUMN 7

Line 57, "Plurality" should read --plurality--.

COLUMN 8

Line 12, "images" (second occurrence) should read
   --image,--;

UNITED STATES PATENT AND TRADEMARK OFFICE
CERTIFICATE OF CORRECTION

PATENT NO. : 5,787,205

DATED : July 28, 1998

INVENTOR : Yasuji Hirabayashi

It is certified that error appears in the above-identified patent and that said Letters Patent is hereby corrected as shown below:

COLUMN 8 (Cont.)

```
Line 37, "images" should read --image,--;
Line 46, "images" should read --image,--;
Line 52, "detesting" should read --detecting--;
Line 61, "images; and wherein" should read
  --image; and (¶)
      wherein--.
```

Signed and Sealed this

Thirtieth Day of March, 1999

Attest:

Attesting Officer

Q. TODD DICKINSON

Acting Commissioner of Patents and Trademarks